Aug. 31, 1965

A. ALVAREZ-CALDERON 3,203,647

HIGH LIFT FLAPS FOR AIRCRAFT WINGS

Filed Dec. 6, 1961

FIG_1

FIG_2

FIG_3

FIG_4

INVENTOR.
ALBERTO ALVAREZ-CALDERON 3,203,647
HIGH LIFT FLAPS FOR AIRCRAFT WINGS
Alberto Alvarez-Calderón, 1560 Castilleja St.,
Palo Alto, Calif.
Filed Dec. 6, 1961, Ser. No. 157,422
10 Claims. (Cl. 244—42)

The present invention is related to trailing edge high lift devices. More specifically, this invention concerns the use on relatively thin wings, of improved flaps which have flap leading edges with a variable shape, and of flaps with inflatable flap leading-edge portions which may also serve as external collapsible air channels for boundary layer control.

It is well known that slotted and "Fowler" type flaps are one of the most effective means to increase the lift of conventional wings. The effectiveness of these camber increasing flaps in a conventional airfoil is due partly to a chordwise extension of the wing area, and partly due to the boundary layer reenergizing action of the slot between the deflected flap and the wing which allows the air from the top of the wing to remain attached to the flap for larger flap deflections than those possible with plain flaps.

Experimental data is available (see for instance FIGURES 1 and 11 of NACA TN 808) which shows that in conventional flapped airfoils, like the well known NACA 23012 wing section with a slotted flap having a relatively thick flap crossection, the chordwise position of the trailing edge of the wing proper—referred to as the slot lip—below which is positioned the leading edge portion of the deflected flap, is one important parameter which determines the maximum lift increment due to the flap. This experiment shows that for this type of wing section, the further back the slot lip is located, the greater is the lift increment possible with the flap. This would be expected due to the increment of effective wing area with rearward displacement of the slot lip and of the flap. For instance, moving the slot lip position from ninety percent of the flap-retracted wing chord to a "Fowler" position at 100 percent of the flap-retracted wing chord improves the increment of maximum section lift coefficient due to flap from 1.35 to 1.75. (See FIG. 1 and 11 of aforementioned reference.) In the latter case the maximum section lift coefficient was 3.30, one of the highest section lift coefficients measured for conventional flaps.

Unfortunately, the use of slotted and Fowler type flaps with thinner low drag wings like those suitable for high subsonic speeds and supersonic speeds, show a considerable deterioration of their high lift characteristics. With reference to the conditions of flow at the trailing edge, this deterioration is partly due to the physical impossibility of housing within the trailing edge of a thin high speed wing a flap which has an aerodynamically suitable flap-leading edge shape, which will permit a favorable geometry for attached flap flows at the large flap deflections necessary for high lift, and partly also to the structural difficulties in constructing a long thin wing trailing edge lip which will permit the housing of a retracted slotted or a Fowler flap with even a compromised flap aerodynamic shape within the basic airfoil contour.

Experimental data shows (see, for instance, FIGS. 1a and 19 of NACA TN 1191) that for the case of thin high speed wings like the NACA 65–210 with slotted trailing edge flaps having flap cross-section compromised by structural limitations and flap-retracted high speed geometric considerations, a rearward displacement of the slot lip and deflected flap position does not result in an improvement of the lift characteristics of the wing. The increments of lift which occur with rearward displacement of the slot lip on more conservative airfoils does not occur. For example, moving the slot lip of a slotted flap on the NACA 65–210 airfoil from 0.84% to 0.90% and to 100% of the flap-retracted wing chord, produces negligible effects on the maximum lift available from the flapped wing, and at lower Reynolds number it even has a slightly adverse effect. This lack of improvement of lift with rearward displacement of slot lip position on the thinner low drag airfoils, as well as the lower magnitude of the maximum lift coefficient attainable, are to a large degree due to the unfavourable geometric shape of the flap and slot imposed by structural considerations. This unfavourable geometry includes a very small leading edge radius of the flap, a lack of contraction in the slot, and insufficient camber in the flap shape.

Further, these thin flapped wings are known to be extremely critical in the slot gap size, and sensitive to interference of flap support brackets. The interference of flap support brackets is specially critical for swept back wings if the brackets are perpendicular to a wing panel axis rather than aligned with the flow, because then the supports are at an angle with the flow rather than aligned with it, and promote a separation of the flap flows in the vicinity of the bracket.

It is known that boundary layer control can improve the lift available from flapped thin wings. However, the necessary air conduits and channels are difficult to provide and also occupy precious volume within the wing's structure. This volume substract from the overall volume available for fuel, instrumentation, etc. Thus the BLC installation may penalize the volume capacity of the aircraft to a serious degree.

It is therefore an overall purpose of this invention to improve the high lift aerodynamic characteristics of thin high speed wings such as to improved the slow speed characteristics of the aircraft using them.

More specifically, it is an object of this invention to provide an improved flap having a variable flap leading edge shape that will permit the housing of the retracted flap within the thin trailing edge of a high speed wing but yet, when the flap is moved to its high-lift position, the flap's cross-sectional shape is varied to provide a slot geometry and flap shape suitable for high lift.

Another object of this invention is then to provide a variable cross-section flap which will occupy a minimum of wing space in the flap-retracted position in order to permit the construction of a structurally satisfactory slot lip extending to the rearmost point of the flap-retracted wing chord. Yet, when the flap is moved rearwards, by virtue of its variable shape, it can have superior aerodynamic characteristics for high lift.

Yet another object of this invention is to provide inflatable tubes to vary the leading edge shape of a flap from a thin deflated cross-section used in the flaps retracted position, to a thick streamline-shaped inflated cross-section used in the high lift position.

One more object of this invention is to provide a variable flap leading edge shape by means of inflatable tubes which also serve as conduits and air channels for the flow of boundary layer air to be discharged by suitably located boundary layer control nozzles to improve the high lift characteristics of the wing.

Yet another object of the invention is to increase the flow of air through the slot between the wings slot lip and the flap's leading edge by means of an expanding flap leading edge which provides a large contraction ratio of the slot.

One more object of this invention is to provide a simplified flap mechanism which allows independent translational and angular motion of the flap and in which the flap supports can be aligned to the direction of flow regardless of the sweep of the wing.

This and other objects of my invention will become more apparent from a perusal of the following figures in which.

Figure 1:
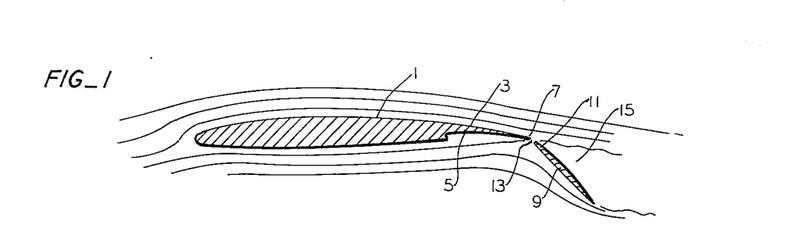
FIG. 1 shows the nature of the airflow round a high speed airfoil with a deflected Fowler flap. A stalled condition due to the poor slot configuration and small flap leading edge size, exists behind the flap.

With initial reference to FIG. 1, there is shown a cross-section of a standard thin wing 1 suitable for high speed flight, having a wing trailing edge portion 3 which has in its lower surface a recess 5 to allow the housing of a retracted flap within the basic airfoil contour. The rearmost portion of the trailing edge 3 constitutes the slot lip 7. The figure also shows an extended deflected flap 9 having a thin cross section necessary to permit retraction of the flap to recession 5. Consequently, the flap has a leading edge portion 11 with a relatively small leading edge radius. This leading edge portion 11 is located approximately directly below the slot lip 7 in the flap extended position as shown, forming a slot 13 therebetween. Because of structural and size limitations, this slot generally has such unfavourable geometric characteristics that it fails to produce a bending of the flow on top of the wing and a flap stall 15 results which limits the maximum lift of the wing. The existence of this type of phenomena for thin wings is well known, see for instance, page 8 of NACA TN 1191 describing tests of a NACA 65–210 airfoil section with a high lift flap.

The structural reasons that prescribe such unfavourable geometry of the slot and flap can be understood by observing that the flap must be very thin to fit in the retracted position, inside the thin-wing trailing edge contour into recession 5. The trailing edge portion of the wing is thin in itself. This sets one limit to the maximum size of the flap. In addition, the depth of recession 5 in the trailing edge of the wing is limited by the necessary structural size of slot lip 3, which should be of the same order of thickness as the flap.

Figure 2:
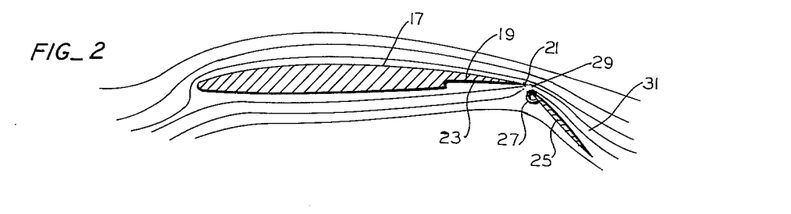
FIG. 2 shows the improved air flow possible with an unstalled flap condition, obtained by modifying the geometry of the flap slot by means of an increased radius and improved shape of the flap leading edge. Lift is increased and drag is decreased.

To solve the double requirement of a thin uncambered flap for retraction into a thin wing, and a thick flap with effective camber and with a large leading edge radius, for high lift in the flap extended position I have, therefore, invented a flap with a variable shape in its leading edge. The advantageous results of such an improved flap on the flow about a wing are shown on FIG. 2. FIG. 2 shows a wing cross section 17 alike wing 1 of FIG. 1, with a thin trailing edge portion 19, a slot lip 21, a wing trailing edge recession 23 to house a thin retracted flap, like flap 9 of FIG. 1 and, in extended deflected position, my improved flap 25. Flap 25 shows a flap leading edge portion with an increased flap edge radius and effective camber possible by means of a collapsible structure 27, shown in the high lift condition and to be described in subsequent figures. This improved collapsible flap leading edge defines a favourable contracting slot 29 between slot lip 21 and flap leading edge portion 27. Through the contracting slot flows an increased volume of air from below the wing at higher speeds. This air flowing through the slot reenergizes the flow from the upper surface of the wing and flap to enable the negotiation of adverse pressure gradients and curvatures behind the slot, and consequently results in an attached flow field portion 31 at the rear of the flap. By comparing flow portion 31 of FIG. 2 with flow portion 15 of FIG. 1, one can realize the improvements of lift and drag possible with my collapsible flap leading edges. This improvement of lift is reflected not only behind the flap but in the entire flow field as shown by the increased downwash and upwash of the wing of FIG. 2 when compared to that of FIG. 1. Yet by collapsing the flap leading edge structure, as will be shown in more detail later, the flap 25 becomes of sufficiently small cross section as to permit its retraction within the contour of thin airfoil 17.

I shall now describe in more detail the preferred structures used to vary the leading edge portions of the flaps.

Figures 3, 4:
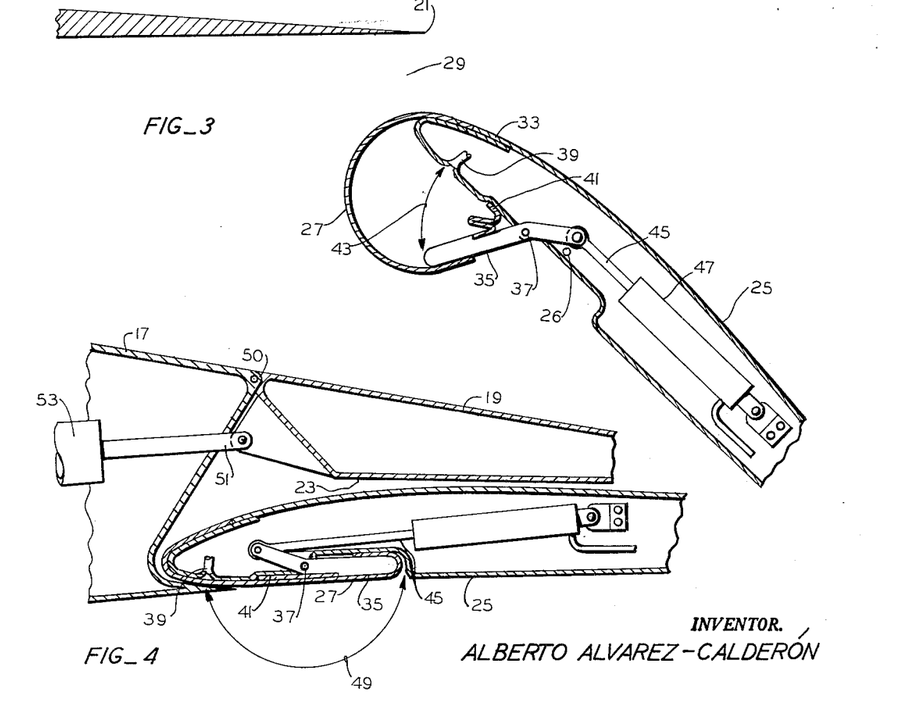
FIG. 3 shows the detail the structure used to increase the radius and improved the shape of the flap's leading edge in FIG. 2. Also shown is the wing's slot lip of FIG. 2.
FIG. 4 shows the structure of FIG. 3 but with the leading edge modifications collapsed and the flap retracted within the wing.

In FIG. 3 I show the details of the collapsible flap leading edge structure of my FIG. 2.

FIG. 3 shows only the region of interest of FIG. 2, including wing slot lip 21, slot 29, collapsible leading edge portion 27, and the forward portion of flap 25. The collapsible leading edge portion of flap 25 is formed by a substantially inextensible but flexible inflatable, and collapsible, spanwise leading edge membrane or boot 27, which is secured on its upper portion to the leading edge of flap 25 along spanwise area 33, and at its lower portion to pivoted spanwise door 35. Door 35 is pivoted at spanwise door axis 37 to flap 25. Membrane or boot 27, together with door 35, and the forward portion of flap 25 included between 35 and 33, define an airtight leading edge tube which may be inflated through valve 39 to a relatively high internal pressure. Auxiliary inner membrane 41 prevents air leaks between door 35 and the flaps.

portion ahead of the door. The exact angular position of door 35 which defines the angle 43 is obtained by displacement of push rod 45 which is regulated by piston device 47. The curvature of cylindrical portion 27 below and to the rear of slot lip 21 should be, under external airloads and in the inflated condition preferably of a smooth and continuous curvature. This can be regulated by means of the internal air pressure and by setting angle 43 of door 35 to its optimum position. As already mentioned, the latter angle can be controlled by means of piston 47 and its exact value can be determined in an actual airplane, but should be of the order shown in the figure. It can be seen by inspection of FIG. 3, that the collapsible leading edge device provides for a large contraction of the slot, a large leading edge radius for the flap which for the figure is of the order of 1½% of the wing chord and 6% of the flap chord, and an increased effective camber of the flap, as can be judged by the downward location of the approximate center of portion 27. This favourable geometry may be compared with the usual unfavourable thin-flap slot and flap geometry which would evidently correspond to the shaded portion of FIG. 3.

In FIG. 4 I show the inflatable flap leading edge structure of FIG. 3 collapsed for flap retraction, and with the flaps in the retracted position within the contour of wing 17, nested in wing trailing edge recession 23 and against trailing edge portion 19. Observe that membrane 27 has been collapsed against flap 25 by turning spanwise door 35 from the position shown in FIG. 3 in a counter clockwise direction (by means of forward movement of rod 45) by an amount approximately equal to 120°, to the position shown in FIG. 4 wherein it makes an angle 49 with the forward portion of the wing of about 180°. The lower surface of flap 25 is shown matching smoothly with the lower surface of wing 17. Observe also that by virtue of the small flap cross section possible with a collapsible flap leading edge, it becomes structurally feasible to construct a reasonably thick wing trailing edge portion 19 which can now extend to the full flap-retracted wing-chord if desired.

In FIG. 4, this portion 19 has been shown pivoted to wing 17 by spanwise pivotal axis 50 in order to permit the use of 19 as a wing spoiler, to vary the gap between the slot lip and the flap for various flap positions by very small angular deflections of 19, and to simplify the geometric requirements of flap retraction and extension if desired by displacing portion 19 upward during retraction and extension of the flap. Pivoted trailing edge portion 19 may be operated for instance by a push rod 51 actuated by hydraulic piston 53.

As can be seen from FIGS. 2, 3, and 4, the use of a collapsible leading edge radius allows for a unique and advantageous solution of complicating flap requirements of high lift and low drag. A thick leading edge radius, a contracting slot, and an increased flap camber have been obtained without compromising the structural strength of the flap, the flap lip, and low drag characteristics of the thin wing.

For additional details concerning the construction and operation of this collapsible structure for a flap leading edge, reference is made to U.S. Patent 2,912,190 of November 10, 1959, "Variable Contour Aircraft." For the methods to translate and rotate the flap with respect to the wing, any of the systems known in the art may be used. For instance, the mechanisms of U.S. Patent 2,609,166 of September 2, 1952, could be used, or others described hereafter in this application.

Figure 5:
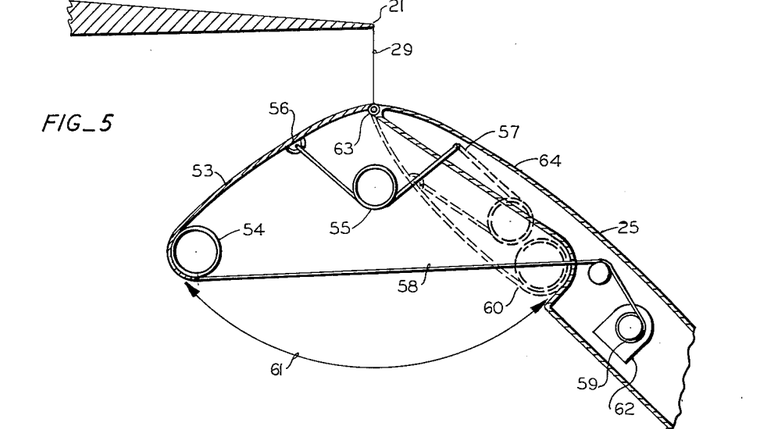
FIG. 5 show an alternate structure used to modify the leading edge of a high lift flap particularly suited for thin wings.

FIG. 5 shows an alternate embodiment of my collapsible flap leading edge invention. It is shown in a position analogous to that of FIG. 3 and to the same scale. Specifically there is shown wing slot lip 21, slot 29 and flap 25. At the leading edge portion of flap 25 there is shown instead of that structure of FIGS. 3 and 4, a pivoted spanwise door at the leading edge of the flap which when extended increases the flapchord, exposes a large cylindrical flap leading edge portion 54, and evidently increase the camber. Specifically, as shown in FIGURE 5, the cross-sectional area of cylindrical edge 54 is substantially larger than the cross sectional area of the leading edge portion of the basic airfoil of flap 25, as is evident by inspection of region 63 of flap 25, compared to cylinder 54. In the extended high lift position shown, the door 53 is positioned to form a converging slot between wing 21 and door 53, which slot discharges high energy air round flap 25. Observe that in the leading upstream portion of door 53, the cylindrical edge 54 allows a smooth flow from the flap's stagnation streamline (not shown) into the slot in a much more favourable condition than if the flap door did not have such a cylindrical leading edge. Also tube 54 serves together with axis 63, as a main structural member of door 53, to provide continuity and strength.

Door 53 may be extended by an arrangement similar to that shown for the door of FIG. 3. In FIG. 4, however, door 53 is opened from the retracted position by means of spreading springs 55, connected to door 53 at pivotal axis 56 and to flap 25 at pivotal axis 57. Several of these springs, loaded to open door 53 by angles of the order of 180°, should be placed at discrete spanwise locations. To retract the door 53 to its high-speed low-drag position suitable for flap retraction, cable 58 which connects cylinder 54 to drum 59 in flap 25, is wound by electric motor 62, whereby door 53 pivots about axis 63 along arc 61 into recession 64 of flap 25 to the final position shown in dash lines 60. In that position in which the flaps cross section has been reduced drastically, it can be nested within the wing's contour in the flap retracted position in a manner similar to that shown in FIG. 4, to derive the same structural and aerodynamic advantages for the wing mentioned in connection to FIG. 4.

Figures 6, 7, 8:
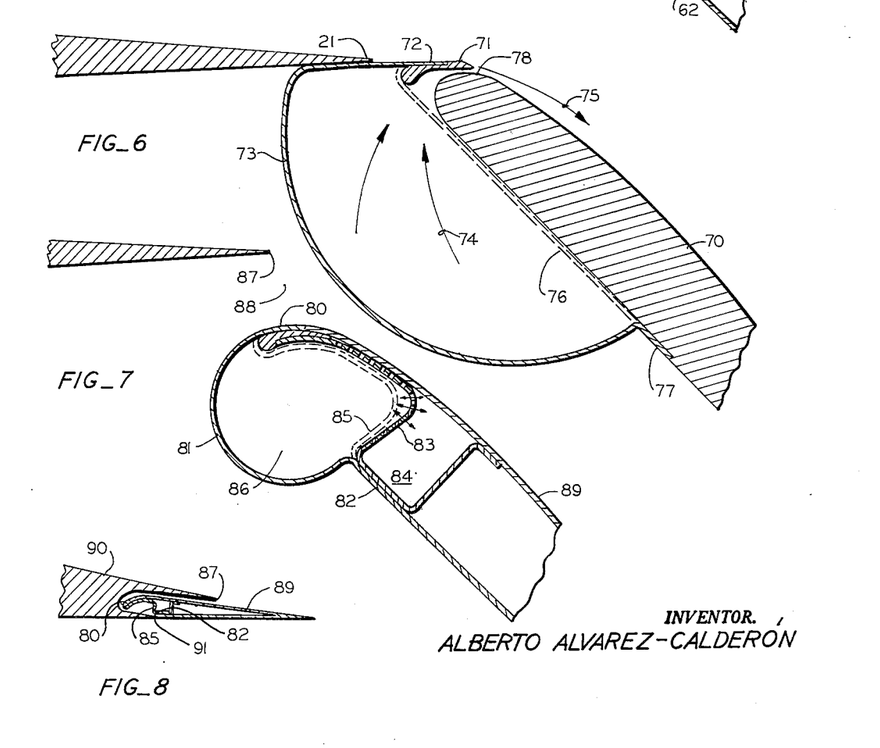
FIG. 6 shows a peculiar use of a flexible and extensible air tube at the leading edge of a flap similar to that of FIG. 3 except that the tube is extensible and is used in combination with a boundary layer control device in which air is blown through the tube and discharged through a flap nozzle.
FIG. 7 shows another alternate structure to modify the leading edge of a flap in which a flexible tube can be inflated for high lift by positive pressure in the tube, and can be collapsed into the flap for retraction of the flap, by providing a negative pressure or vacuum.
FIG. 8 shows a sketch of the structure of FIG. 7 with the flap retracted in the wing.

FIG. 6 shows a peculiar use of a collapsible leading edge tube for blowing boundary layer on a flap. The advantages of this structure are several. First, the volume storage capacity and structural continuity of the wing is not interfered with ducts and channels for boundary layer control air, as is usually the case in wings with BLC. Second, the use of area increasing BLC flap like say a BLC Fowler flap, becomes structurally possible, and even on a thin flap. Whereas is the past BLC flaps are generally a simply-pivoted or plain flap because of the difficulties involved in arranging an efficient BLC duct and nozzle at the trailing edge portion and slot lips, respectively, of a relatively thin wing, it now becomes possible and advantageous to use an area increasing flap with BLC, whereby an additional lift increment due to increasing area is obtained.

Third, the system provides for a natural seal between the flap and the wing and is designed to blow BLC air generally tangentially to the flap regardless of the flap's angular position.

Specifically, there is seen in FIG. 6 a wing's slot lip 21, and the forward portion of flap 70. Notice, however, that in this figure there is no slot between lip 21 and the flap. Instead the foremost part of the flap proper denoted as 71 is approximately level with, or slightly higher than, slot lip 21, and slightly to the rear of it. A collapsible spanwise membrane 73 is shown in the operative extended position, beginning at the foremost region of flap 70 in area 72, extending forward by virtue of its internal pressure towards the wing and below wing lip 71 whereby a flexible seal is made between the flap and the wing, and extending downward in a cylindrical manner back to flap 70 at area 77. The extended membrane 73 together with the forward portion of flap 70 define then a spanwise (collapsible) tube that is used to supply air for BLC air 74 of flap 70. Air 74 flows into nozzle 78 and out by path 75 whereby large lift increments and drag reduction will result, as is known in the art. Air 74 is supplied under internal pressure sufficient to position flexible extensible membrane approximately as shown in position 73; when the BLC system is inoperative, the internal pressure is eliminated, whereby the membrane contracts by its natural elastic properties to dash line position 76, at which time flap's 70 overall cross section is that of a thin flap which can be easily stowed on the trailing edge portion of a thin wing, as explained in connection to FIG. 4.

The construction of a membrane such as 73, which is extensible under internal pressure, and the control of supply of air for it, is a matter familiar to those skilled in the art. For instance, the membrane may be constructed according to U.S. Patent 2,934,288 of April 26, 1960, and air may be supplied to it by a flexible tube connecting one of its ends to the main portion of the wing. It should be observed in reference to the presence of nozzle 78, that in order to have air discharge through it at high speeds, it is necessary that the internal pressure of the membrane be a high pressure, which high pressure thus also serves to extend the flexible membrane. Since the exact shape of the membrane below the wing and the flap is not of extreme importance for this particular configuration, the membrane may be constructed with greater freedom and of a more stretchable material than that considered in U.S. Patent 2,934,288 if a smaller internal pressure is desired for its full inflation. Also, since the membrane in the flap retracted position need not be exposed to the airstream, the lower portion of the membrane need not be streamlined to the flap.

FIG. 7 shows an alternate structure to those shown in FIGS. 4 and 5, and differs from those figures principally in the method whereby the leading edge membrane is collapsed. Specifically, there is shown a wing slot lip 87, a slot 88, and a flap 89. The leading edge of flap 89 is shown with the collapsible spanwise membrane forming the leading edge portion of it and shown extended in position 81, beginning in area 80 on the forward portion of the flap and ending in area 82, on the lower surface of the flap. Membrane 81 should be flexible but relatively inextensible whereby large internal pressures may be supplied in the internal portion of the forward end of the flap denoted as 84, which pressure acts across porous baffle 83 in and into region 86 whereby the shape of 81 is determined more rigidly than would be possible if 81 were extensible and therefore deformable under large internal pressures. In order to collapse membrane 81, internal pressure in region 84 is converted into negative pressure by a air pump or similar device, whereby air is drawn out through baffle 83, pressure in region 86 decreases below the external pressure and membrane collapses to position 85 whereby the flap assumes a thin flap cross section suitable for retraction into a thin wing.

The position of the retracted flap of FIG. 7 is shown by way of illustration in FIG. 8. In this figure there is shown a wing 90 having a slot lip 87 somewhat ahead of the flap's retracted wing chord. The flap 89 is shown retracted forming part of the airfoils contour and with its leading edge 80 and collapsed membrane 85 housed within the wing by means of lower wing lip 91 which extends below the leading edge portion of the flap, up to flap area 82, whereby the lower surface of the wing and the flap form a smooth and continuous surface.

It should be understood that the previous figures describe some preferred embodiments but are not the only ones. For instance, in other advantageous structures, the collapsible structure of FIG. 3 should use an extensible membrane of the type mentioned in reference to FIG. 6 instead of the spanwise door mechanism with an unextensible membrane. FIG. 3 could be modified to use a BLC nozzle like that of FIG. 6 together with a flap slot or without one. Also, the door 35 and membrane 27 in FIGURE 3 can be replaced by an elastic inflatable membrane like membrane 108 of my FIGURE 9, or by membranes of the types shown in U.S. Patent 2,937,826 of May 24, 1960.

While a full chord or "Fowler" slot lip position has been mentioned in FIGURE 2, a more forward position may be advantageous structurally, like that shown in FIGURE 8.

Figures 9, 10, 11, 12, 13, 14:
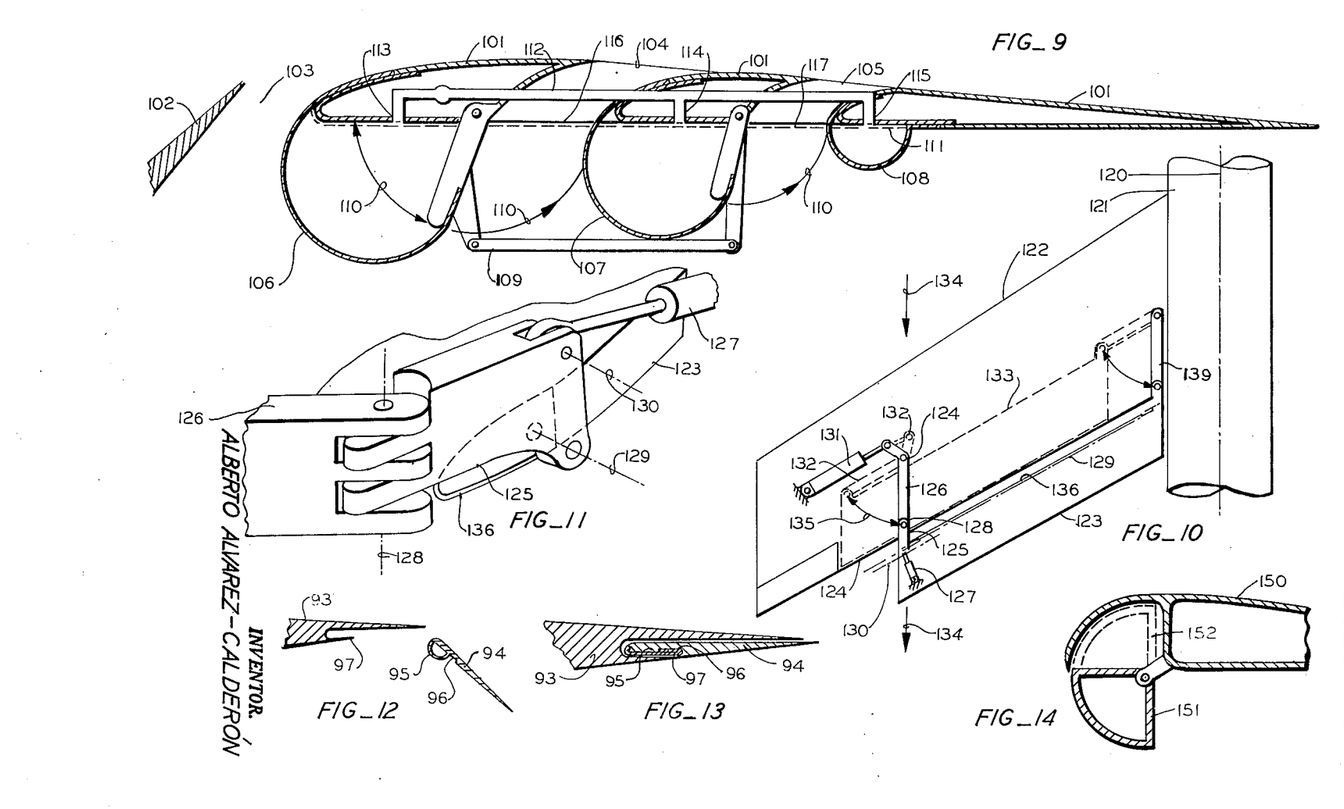
FIG. 9 illustrates the use of collapsible air tubes to modify a thin flap suitable for high speed wings into an efficient high lift multislotted flap of thick cross section with contracting slots.
FIG. 10 shows a wing planform viewed from below, which illustrates my flap mechanism used to displace the flap to the rear of the wing and to deflect it downwards.
FIG. 11 shows in perspective and from above some detail of the hinge connections of the flap mechanism of FIG. 10.
FIG. 12 shows a cross section of a simplified collapsible flap leading edge tube of the type shown in earlier figures.
FIG. 13 is a view showing the structure of FIG. 12 but with the flap retracted and the flap leading edge tube collapsed.
FIG. 14 shows a structure similar to FIGURE 7 except that a pivoted metallic shield is used to obtain an increased flap radius.

In the structures disclosed so far, in order to collapse the flap's leading edge structure, mechanical and pneumatic devices have been shown of the type generally considered for leading edge of wings. However, it should be realized that if at least the flap leading edge portion is housed within the wing for high speed flight, then a smooth disposition of the collapsed flap leading edge structure is not essential for low drag of the wing in the flap retracted position and therefore the collapsing mechanisms may be considerably simplified. For instance, in FIGURE 7 it was possible to use an inextensible membrane without moving parts even though the collapsed membrane leaves a concavity in the leading edge of the flap, because when the flap is retracted this concavity is housed completely within the wing as in FIGURE 8. Although negative pressure has been described in order to collapse membrane 81 in FIGURE 7, obviously internal springs could have been used or even the high pressure of the air below the wing and on the flap could have also collapsed the membrane. In FIGURES 12 and 13, I show an extremely simple method to install a collapsible relatively inextensible flexible membrane on the leading edge of a flap. Specifically in FIG. 12 there is shown a wing trailing edge portion 93, and a thin flap 94 with a cylindrical inflatable inextensible leading edge membrane 95 of very flexible but inextensible material, for instance, a thin rubberized fabric. The membrane is shown extended in its high lift position under large internal pressure. The flap shows recession 96 and the wing a lower wing lip 97. In order to collapse the structure, internal pressure is released and the flexible membrane deflates and collapses backward and against the flap's lower surface under the action of an airflow and air pressures like that shown on the flap of FIG. 1.

As the flap is moved forward and upward for flap retraction, the flexible thin collapsed membrane assumes a streamlined shape and in that condition the flap is displaced forward into the wing, above wing lip 97 and into a final position shown in FIG. 13, in which membrane 95 is against lip 97, and partly fitting into flap recession 96. When the flap is moved rearward again there is no difficulty as the membrane may easily slide past lip 95 or partially against the flap itself. Thus in this structure there are no moving parts for the membrane's collapse and yet an inextensible membrane may be used with large internal pressures to secure a rigid inflated membrane of a prescribed aerodynamic shape for very high lift, yet the flap can be extremely thin for retraction into the trailing edge portion of a thin wing.

FIG. 9 shows the application of my collapsible spanwise inflatable membranes on the leading edge, and between the slots, of a multislotted high lift flap suitable for use on thin wings. This flap structure allows very large flap deflections of the order of 50 degrees or more with attached flows, and yet can be collapsed for storage into a very thin wing. Specifically, there is shown a wing slot lip 102, a slot 103 between lip 102 and the leading edge of a flap, and a multislotted flap 101 having flap slots 104 and 105 in the flap itself which serves to reenergize the boundary layer of the flap and improve the flow generally, as is well known to those skilled in the art. As shown in the figure, the flap is actually a triple-slotted flap, but evidently the figure also describes an excellent double slotted flap by elimination of lower flap slot 105 and membrane 108.

In the figure the flap cross section is shown in the high lift position with all slots open and with the spanwise membranes 106, 107 and 108 extended into cylindrical shapes, as shown in the drawing, under the action of internal pressures. The internal pressure is supplied from manifold 112 into outlets 113, 114, and 115 which eject into the lower surface of the flap in the regions covered by membranes 106, 107 and 108 respectively. The structure of the collapsible membranes may be of any of the types described in this specification, and in the aforementioned U.S. patents of reference. In this figure, however, membrane 106 and 107 are shown to be of the type shown in FIG. 3. Thus, the exact shape of each membrane may be determined by internal pressure and by mechanical position of angle 110 as described earlier. This angle may be varied mechanically with flap position if desired, making it smaller than the angle shown for flap deflections smaller than approximately 45 degrees. Observe that the collapsing mechanisms of membranes 106 and 107 are shown connected by a simple parallelogram linkage 109 which allows simultaneous collapse of the structures if desired. Membrane 108 is shown in the drawing to be of the extensible type deformable under the action of internal pressure.

To collapse the structure, the air pressure is removed and the parallelogram or four arm linkage 109 is moved to the rear by angles 110 whereby members 106 and 107 are collapsed to position 116 and 117 respectively, and membrane 108 to position 111. The flap has now become a very thin structure having, in fact, a maximum thickness less than one half of the maximum thickness had in the extended lift position, and can be readily stored into a thin wing.

With reference to linkage 109, it should be placed at one end or both ends of the spanwise membranes in order to prevent interference of the linkage with membrane 107. It can also be placed internally in the flap, like say rod 45 in FIG. 3, whereby it actually forms part of the retracting mechanism of the membranes. Because of the size of FIG. 9, it was not practical to show it in this form in the drawing. It should be observed that the shape of the extended membranes and slots can be regarded as accurate, and that the gap in the slots should be preferably approximately between 1 and 4 percent of the wing chord.

FIG. 10 shows in plan view and from bottom to top a mechanism to extend a flap from a retracted high speed position in which the flap forms part of and is within the wing, to an extended high lift position in which the trailing edge of the wing is approximately directly above the leading edge of the flap. This mechanism offers several structural advantages very specially for thin swept wings. It also allows if desired to deflect the flap independently of its position. As can be seen in the figure the flap extending mechanism is not the usual chordwise flap track arrangement for Fowler or slotted flaps, but it is essentially a four arm linkage supported by, and in the plane of, the wing. One arm of the linkage is the wing itself, another is the flap and the remaining arms are at least two pivoted flap brackets pivotally connected to the wings and to the flap by substantially vertical axis on the wing and flap. Specifically FIG. 10 shows a portion of a fuselage 121 having a longitudinal axis 120 and supporting a swept wing 122. Wing 122 has at its trailing edge a high lift flap 123 shown extended in the high lift position with its flap leading approximately below and parallel to the wing trailing edge. The flap is supported by two similar flap brackets 126 and 139 to the wing; therefore, only the flaps support of bracket 126 will be described.

Flap support bracket 126 is shown connected to the wing at generally vertical wing pivot axis 124, and to the flap at flap ear 125 by generally vertical flap pivot axis 128. These connections are shown in greater detail in FIG. 11. Preferably flap bracket 126 should be pivoted by an axis 124 which is specifically perpendicular to the upper surface of the wing. Flap bracket 126 is shown extending beyond axis 124 into the wing for connection with piston 131. The piston is used for flap retraction as is evident in the figure. The flap ears 125 are connected to the flap by means of spanwise flap pivotal axis 129 and pivotal axis 130 to which is connected flap piston 127 used to deflect the flap angularly. This is also shown in greater detail in FIG. 11. It should be observed that in the extended position flap bracket 126 and flap ear 125 are both aligned with the local flow direction 134, whereby the loss of lift due to flap support interference is minimized, specially if the flap is supported at discreet locations in its span as is usually the case. (In the drawing, the flap is shown supported at its ends for convenience only.) Evidently it is usually the case that flaps have more than two supports not located at the flap's edges for structural reasons. However, in this arrangement even if located at the flap's edges, the supports like 126 may act as flap's tip plates. Also seen in the flap is collapsed flap leading edge membrane 136.

To retract the flap piston 131 is activated whereby pivoted bracket 126 (and 139) swings about axis 124 and along path 135 to position 132, whereby the flap is translated to high speed position 133.

Although in FIG. 10, the flap has been shown extended to a full "Fowler" position like in FIG. 1, evidently the mechanism is also applicable for flap positions such as that shown in FIG. 8, whereby flap bracket 126 is reduced in length.

Two additional details of importance should be noticed: One is that the angular displacement of the flap support bracket is greatly reduced from the ninety degrees required in an unswept wing, since the bracket is displaced by an angle approximately equal to ninety degrees minus the sweep angle. Another is that rear flap translation is accompanied by sidewise translation. This can be used to advantage in order to open a spanwise flap gap with flap deflection between flap sections that are contiguous in the flap retracted position. This gap would be useful to permit the free passage of hot exhaust gases from jet powerplants mounted below the wing.

The structure and flap support mechanisms are shown in greater detail in FIG. 11, which shows in a view from an outboard position, and from above (rather than below) the lower left corner of the flap in FIG. 10. Specifically FIG. 11 shows the outborad portion of flap 123 connected to flap ear 125 by spanwise flap pivot axis 129 and by means of flap piston 127 connected to flap ear 125 at spanwise axis 130. Now evidently extending the push rod of piston 127 displaces the portion of the flap to the rear of 129 downwards in an angular motion about axis 129. This is then a mechanism to control and set the angular position of flap 123 with respect to flap ear 125 independently of the position of the flap bracket 126 if so desired, as for instance if the flap were to be used as slow speed ailerons. The flap ear 125 is shown connected to flap bracket 126 at generally vertical axis 128. It should be observed that the depth of bracket 126 (in the direction of axis 128) is greater than the flap's thickness. The importance of this dimension is that it permits the use of relatively light brackets, and it adds strength for a given weight of the bracket. It also permits an efficient pivotal connection at 128 and it allows for a large distance between axes 129 and 130 for effective action of piston 127. In fact, the depth of entire bracket 126 may be of the order of the depth of the wing section at the chordwise location of the brackets pivotal axis. This is possible because if the flap bracket is pivoted to the wing perpendicular to the upper surface of the wing, then evidently (as can be seen in the retracted position 132 of FIG. 10) the retracted flap bracket will lie in a spanwise direction and its depth over the entire bracket length may be of the same order as the wing's depth without imposing any drag aerodynamic penalties. As already mentioned the depth of the flap support brackets over their entire length may be made as high as the thickness of the wing at the wing locus where the bracket support axis are located (like axis 124), when the support axis is made perpendicular to the upper surface of the wing. This mounting will evidently require that the flap be mounted at the lowest level of the bracket like in FIG. 11. In the extended position of the bracket (not shown in FIGS. 10 and 11), its upper surface would be level with lower surface of the slot lip and axis 129 of FIGS. 10 and 11 should be located somewhat below the level of the slot lip and to the rear of the flap's leading edge, for instance, as shown by axis 26 in FIG. 3 which is a side view, approximately to scale, of a similar flap in the extended position and in which axis 26 corresponds to axis 129 of FIGS. 10 and 11. It can be seen by inspection of FIG. 3 that counterclockwise angular deflection of the flap about fixed axis 26 (which is fixed with respect to the wing by virtue of flap supports like those of FIGS. 10 and 11, not shown in FIG. 3) causes the upper leading edge portion of the flap to move away from the slot when the flap is raised. This is advantageous as it allows to design a variation of the slot gap with flap position which is desirable for aerodynamic reasons, very easily, by choosing the proper location of the spanwise flap pivot axis. For instance, for the scale used in FIG. 3 of 1 inch=2% of wing chord and with a flap chord of 25% of the wing chord, the location of axis 26 allows a flap slot gap of the order of 1½% of the wing chord for flap deflections of the order of 45 degrees, and larger slot gaps of the order of 3% of the wing chord for flap deflections of the order of 20 degrees. The axis 26 is located approximately at 4% of the wing chord to the rear of the flap's rigid leading edge portion and closer to the flap's lower surface than to the flap's upper surface. This location allows also substantial aerodynamic balance of the flap about its flap axis whereby substantial reduction of weight of flap actuator like 127 of FIG. 11 can be realized.

Summarizing the advantages of the flap extension mechanism of FIGS. 10 and 11, it should be said that the system allows for the use of deep, light, strong flap support brackets with efficient flap pivotal connections, the flap brackets are aligned with the local flow for the flap extended position, the usual costly and cumbersome flap tracks are avoided, and the flaps can be retracted by a small angular displacement of the system of the order of the compliment of the sweep angle of the wings.

FIG. 14 shows an expandable flap leading edge portion similar in cross section to that of FIG. 7, except that a metallic shield has been substituted for the membrane. Specifically FIG. 14 shows a flap leading edge portion 150 having in its leading edge a pivoted spanwise shield 151 which is shown in its high lift position 151 increasing the effective chord and leading edge size of the flap. The shield can be retracted within the flap to position 152 to permit the housing of the thin flap within the wing.

It should be understood that although the previous structures have been described as flaps, the embodiments of my invention are applicable to elevators, ailerons and rudders of aircraft and other vehicles like ground effect machines, hydrofoil boats which utilize flap like structures.

Various further modifications and alterations from those described hereinabove can obviously be made without departing from the spirit of this invention, and the foregoing are to be considered purely as exemplarly application thereof. The actual scope of this invention is to be indicated by reference to the appended claims.

I claim:

1. An aircraft wing comprising a main wing member having an upper surface and a trailing edge, a flap mounted on said main wing member adjacent to said trailing edge with said flap having a flap upper surface, a flap leading edge, and a flap under surface portion adjacent to said flap leading edge, flap actuating means interconnecting said main wing member and said flap for moving said flap between a retracted position with said flap leading edge within the contour of said main wing member and an extended position with said flap leading edge outside of said main wing member and with said flap upper surface extending downwardly from said wing upper surface to increase the camber of said wing, and means on said flap for expanding said flap under surface portion to move a part thereof upstream from said flap and away from said flap upper surface when said flap is in said extended position to increase the camber of said flap in the same direction as the movement of said flap to said extended position increases the camber of said wing.

2. The structure of claim 1 further characterized in that said means on said flap for expanding said flap undersurface portion away from said flap upper surface comprise a leading edge flap portion pivotally connected to said flap at a spanwise axis substantially parallel and contiguous to the leading edge of said flap.

3. The structure of claim 1 further characterized in that when said flap is in its flap retracted position, said flap leading edge is in front of said wing trailing edge, and in that when said flap is in its flap extended position it is positioned with respect to the wing with the upper forward surface of the flap leading edge portion slightly below the wing trailing edge and defining therebetween a spanwise slot rearwardly directed and rearwardly contracting.

4. An aircraft wing comprising a main wing member having an upper surface and a trailing edge, a flap mounted on said main wing member adjacent to said trailing edge with said flap having a flap upper surface, a flap leading edge, and a flap under surface portion adjacent to said flap leading edge, flap actuating means interconnecting said main wing member and said flap for moving said flap between a retracted position with said flap leading edge within the contour of said main wing member and an extended position with said flap leading edge outside of said main wing member and with said flap upper surface extending downwardly from said wing upper surface to increase the camber of said wing and means on said flap for moving said flap undersurface portion upstream from said flap and away from said flap upper surface when said flap is in said extended position to increase the camber of said flap in the same direction as the movement of said flap to said extended position increases the camber of said wing; said flap being further characterized in that said means on said flap for moving said flap undersurface portion away from said flap upper surface comprise an inflatable spanwise flexible membrane in the leading edge portion of said flap with said membrane defining at least in part said undersurface portion.

5. An aircraft wing comprising a main wing member having an upper surface and a trailing edge, a flap mounted on said main wing member adjacent to said trailing edge with said flap having a flap upper surface, a flap leading edge, and a flap undersurface portion adjacent to said flap leading edge, flap actuating means interconnecting said main wing member and said flap for moving said flap between a retracted position with said flap leading edge within the contour of said main wing member and an extended position with said flap leading edge outside of said main wing member and with said flap upper surface extending downwardly from said wing upper surface to increase the camber of said wing and means on said flap for moving said flap undersurface portion upstream from said flap and away from said flap upper surface when said flap is in said extended position to increase the camber of said flap in the same direction as the movement of said flap to said extended position increases the camber of said wing; said flap being further characterized in that said means on said flap for moving said flap undersurface portion away from said flap upper surface comprise an inflatable spanwise flxexible membrane in the leading edge portion of said flap with said membrane defining at least in part said undersurface portion, said wing and flap being further characterized in that when said flap is in its flap retracted position, said flap leading edge is in front of said wing trailing edge, and in that when said flap is in its flap extended position it is positioned with respect to the wing with the upper forward surface of the flap leading edge portion slightly below the wing trailing edge and defining therebetween a spanwise slot rearwardly directed and rearwardly contracting.

6. An aircraft wing comprising a main wing member having an upper surface and a trailing edge, a flap mounted on said main wing member adjacent to said trailing edge with said flap having a flap upper surface, a flap leading edge, and a flap under surface portion adjacent to said flap leading edge, flap actuating means interconnecting said main wing member and said flap for moving said flap between a retracted position with said flap leading edge within the contour of said main wing member and an extended position with said flap leading edge outside of said main wing member and with said flap upper surface extending downwardly from said wing upper surface to increase the camber of said wing and means on said flap for moving said flap undersurface portion upstream from said flap and away from said flap upper surface when said flap is in said extended position to increase the camber of said flap in the same direction as the movement of said flap to said extended position increases the camber of said wing; said flap being further characterized in that said flap has a flap body and a flap trailing edge with means defining a spanwise slot in the flap between said flap leading and trailing edges for conveying fluid from said flap lower surface to said flap upper surface with said slot having a fluid intake mouth on said flap lower surface, and in that a spanwise inflatable membrane is provided on said flap body defining at least in part said flap lower surface between said flap leading edge and said slot intake mouth, and means are provided in said flap to inflate said membrane from a deflated position in which said membrane is adjacent to said flap body and an inflated position in which said membrane is displaced outwardly from said deflected position.

7. An aircraft wing comprising a wing member having a trailing edge, a flap mounted on said wing adjacent to said trailing edge with said flap having means forming an expandable flap leading edge portion, flap actuating means for moving the flap between a retracted position substantially within the airfoil contour of said wing member in which position said leading edge portion has a reduced cross-sectional area and said flap a decreased camber, and an extended position wherein said flap increases the camber of said wing and in which said leading edge portion of said flap is expanded to have an increased cross-sectional area greater than said reduced cross-sectional area, with said expanded leading edge portion augmenting the camber of said flap in the same direction as the movement of said flap to said extended position increases the camber of said wing; said flap being characterized further in that said means forming a portion of said leading edge portion of said flap comprises: a door mounted on said flap along the undersurface of said flap and having leading and trailing edges, means pivotally connecting said door to said flap adjacent to the leading edge of said door, a spanwise flexible membrane having opposite edges connected to said flap and door adjacent to said flap leading edge and said door trailing edge respectively, with said membrane extending along the lower surface of said flap, and means for inflating said membrane to pivot said door downwardly and forwardly to increase the camber of the flap.

8. An aircraft wing comprising a wing member having a trailing edge, a flap mounted on said wing adjacent to said trailing edge with said flap having means forming an expandable flap leading edge portion, flap actuating means for moving the flap between a retracted position substantially within the airfoil contour of said wing member in which position said leading edge portion has a reduced cross-sectional area and said flap a decreased camber, and an extended position wherein said flap increases the camber of said wing and in which said leading edge portion of said flap is expanded to have an increased cross-sectional area greater than said reduced cross-sectional area, with said expanded leading edge portion augmenting the camber of said flap in the same direction as the movement of said flap to said extended position increases the camber of said wing; said flap being characterized further in that said means forming an expandable leading edge portion comprise; an inflatable and substantially inextensible spanwise membrane connected at a first spanwise membrane edge to said leading edge portion and at a second spanwise membrane edge to an articulated spanwise plate adjacent to the undersurface of said flap with said plate and membrane being adjacent and contiguous to said flap when said flap is retracted and with said plate being inclined at a large angle to said flap when said membrane is inflated and said flap is in said extended position.

9. An aircraft wing comprising a wing member having a trailing edge, a flap mounted on said wing adjacent to said trailing edge with said flap having means forming an expandable flap leading edge portion, flap actuating means for moving the flap between a retracted position substantially within the airfoil contour of said wing member in which position said leading edge portion has a reduced cross-sectional area and said flap a decreased camber, and an extended position wherein said flap increases the camber of said wing and in which said leading edge portion of said flap is expanded to have an increased cross-sectional area greater than said reduced cross-sectional area with said expanded leading edge portion augmenting the camber of said flap in the same direction as the movement of said flap to said extended position increases the camber of said wing; said flap being characterized further in that said means forming an expandable leading edge portion comprise; an articulated spanwise plate having a first spanwise edge connected to said leading edge portion of said flap and a second spanwise edge having a spanwise tube with a cross-sectional area greater than that of said leading edge portion of said flap, with said plate being adapted to be moved from a position approximately parallel to said flap with its second edge trailing said leading edge when said flap is in said retracted position, to an inclined position in which said second edge is below and upstream from said leading edge portion when said flap is in said extended position.

10. An aircraft wing comprising a wing member having a trailing edge, a flap mounted on said wing adjacent to said trailing edge with said flap having means forming an expandable flap leading edge portion, flap actuating means for moving the flap between a retracted position substantailly within the airfoil contour of said wing member in which position said leading edge portion has a reduced cross-sectional area and said flap a decreased camber, and an extended position wherein said flap increases the camber of said wing and in which said leading edge portion of said flap is expanded to have an increased cross-sectional area greater than said reduced cross-sectional area with said expanded leading edge portion augmenting the camber of said flap in the same direction as the movement of said flap to said extended position increases the camber of said wing; said flap being characterized further in that said means forming an expandable leading edge portion comprise: an inflatable and substantially inextensible spanwise membrane which is adapted to be withdrawn contiguous to and below the upper surface of said leading edge portion to a position in which the surface of said membrane face downwardly, is concave and cooperates to define a leading edge portion of said flap having a decreased cross-sectional area when said flap is retracted; and is inflated to a convex and downwardly facing rounded shape which cooperates to define a rounded leading edge portion of increased cross-sectional area for said flap when said flap is in said extended position.

(References on following page)

References Cited by the Examiner

UNITED STATES PATENTS

| | | | |
|---|---|---|---|
| 2,246,116 | 6/41 | Wagner | 244—42 |
| 2,278,562 | 4/42 | Raymond | 244—42 |
| 2,772,058 | 11/56 | Grant | 244—42 |
| 2,920,844 | 1/60 | Marshall | 244—42 |
| 3,041,014 | 6/62 | Gerin | 244—42 |
| 3,126,173 | 3/64 | Alvarez-Calderon | 244—42 |

FOREIGN PATENTS

| | | |
|---|---|---|
| 1,003,096 | 11/51 | France. |
| 1,239,330 | 7/60 | France. |

MILTON BUCHLER, *Primary Examiner.*

EMILE PAUL, *Examiner.*